Aug. 1, 1944.　　　C. L. COOK ET AL　　　2,354,850
TRACTOR CONTROLLED HARROW
Filed Dec. 17, 1941
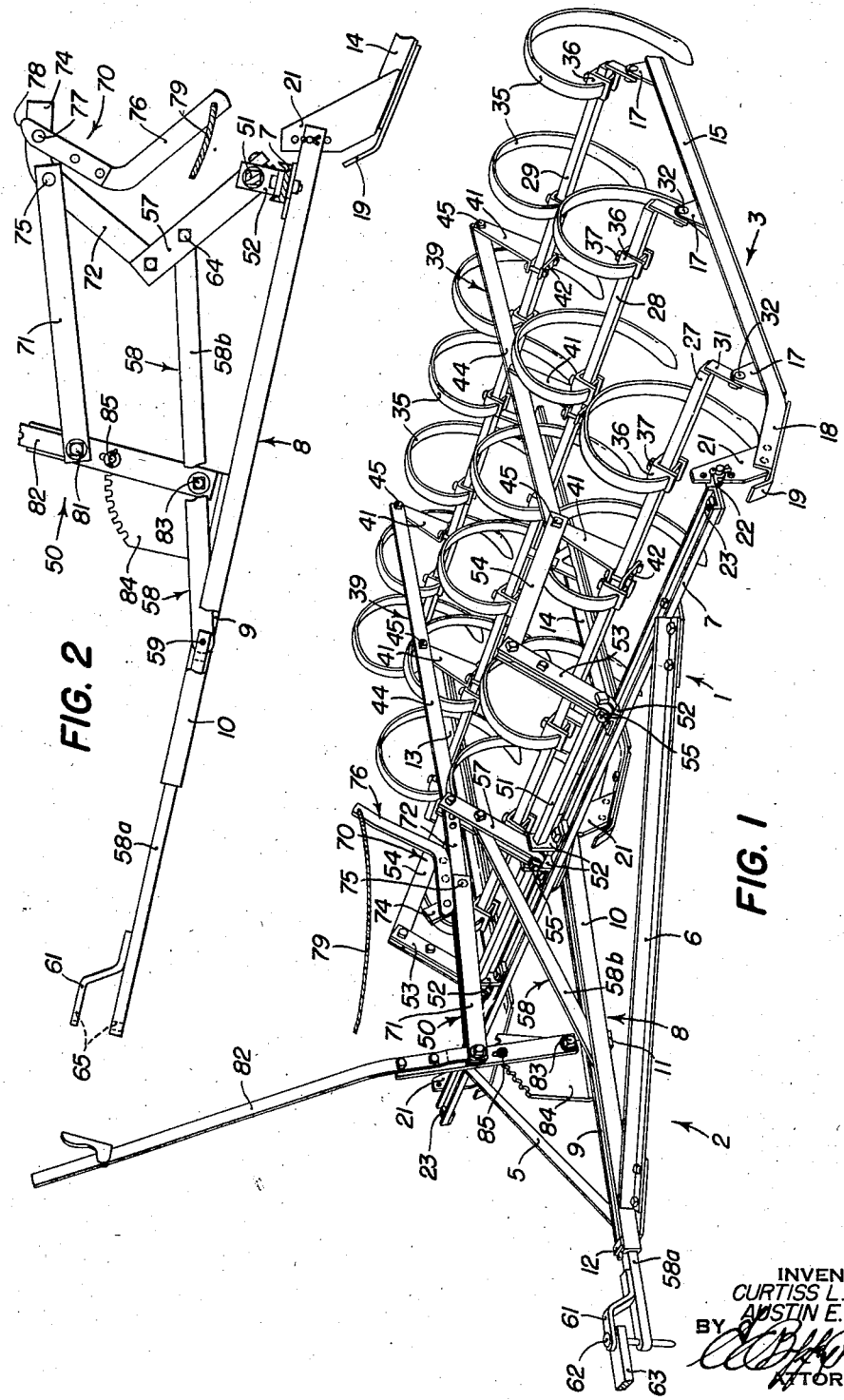
INVENTORS
CURTISS L. COOK
AUSTIN E. YOUNG
BY
ATTORNEYS Patented Aug. 1, 1944

2,354,850

UNITED STATES PATENT OFFICE 2,354,850

TRACTOR CONTROLLED HARROW

Curtiss L. Cook and Austin E. Young, Syracuse, N. Y., assignors to Syracuse Chilled Plow Co., Inc., Syracuse, N. Y., a corporation of New York Application December 17, 1941, Serial No. 423,326

12 Claims. (Cl. 55—104)

The present invention relates generally to farm implements of the tractor drawn type and more particularly to implements in which the position of the ground working tools is controlled by movement of the tractor relative to the implement.

The object and general nature of the present invention is the provision of an implement of this type in which means is provided for adjusting the operating position of the tools in conjunction with releasable means which controls the movement of the tools by the backing or forward movement of the tractor, the construction being such that the tractor may be used for moving the tools from operating to non-operating position and vice versa without moving the setting of the adjustable means that determines the operating depth of the tools. More particularly, it is a feature of this invention to provide a harrow of the spring tooth type so constructed and arranged whereby the teeth of the harrow may be changed from transport position to working position by backing the tractor and in which the teeth are held in working position by a releasable lock which reacts against an adjustable hand lever that determines the operating depth of the tools. Further, it is another feature of this invention to provide remote control means for releasing the lock to permit the forward movement of the tractor to swing the teeth into transport position, the adjusting lever remaining in its position of adjustment so that the teeth may again be restored to the predetermined operating position merely by backing the tractor.

These and other objects and advantages of the present invention will be apparent to those skilled in the art after a consideration of the following detailed description, taken in conjunction with the accompanying drawings in which the preferred form of the invention has been illustrated.

In the drawing:

Figure 1 is a perspective view of a spring tooth harrow in which the principles of the present invention have been incorporated; and Figure 2 is an enlarged fragmentary side view showing the draft operated linkage in collapsed position, corresponding to the raised position of the tools.

Referring now more particularly to Figure 1 of the drawing, the harrow comprises frame means indicated in its entirety by the reference numeral 1 and which includes a hitch structure or draft frame 2 and a structure comprising tool supporting means 3. The draft frame 2 comprises a pair of rearwardly diverging bars 5 and 6 connected together at their forward ends and at their rearward or laterally spaced ends to a cross bar 7. A center member 8 comprises a pair of channels 9 and 10 connected together in closely spaced relation by means including a clip 12 welded to the front ends of the members 9 and 10 and a rear plate 11 to which the central portion of the transverse bar 7 is fixed in any suitable manner. The tool or tooth bar supporting structure 3 comprises three runners 13, 14 and 15, preferably of identical construction except that one may be right hand and the other left hand, hence a detailed description of one bar will suffice. Each runner bar carries a plurality of brackets 17 and at its forward end is bent upwardly and forwardly, as at 18, to secure a sled runner effect, and a suitable wear plate 19 is adjustably fixed to the upwardly bent portion 18 of each of the runners 13—15. An upwardly extending draft plate 21 is also fixed to the forward end of each of the runner bars 13—15 and is provided with a plurality of apertures in any one of which a pin may be disposed to connect a draft frame clevis 22 thereto. Preferably, the clevises 22 are connected to the transverse draft frame bar 7 by a bolt 23 or the like. The wear plates or wear shoes 19 are connected by means of a slot and bolt arrangement so that each shoe can be adjusted downwardly as wear occurs. Also, the wear plates or wear shoes 19 can be reversed or replaced to prevent wear of the angled portions 18 of the runner bars.

Rockably mounted on the tool supporting structure 3 of the harrow is a plurality of transverse fore and aft spaced tooth bars 27, 28 and 29. An angle clip 31 is fixed to each end of each of the tooth bars and is apertured to receive a pivot bolt 32. The bolts 32 thus define axes of rocking movement of the tooth bars on the runner bars 13—15. A plurality of teeth 35 are fixed by any suitable means, preferably adjustable, to the tooth bars 27, 28 and 29. In the preferred construction illustrated, the teeth 35 are spring harrow teeth and are fixed to the tooth bars by U-shaped clamping yokes 36 which embrace the associated tooth bars and are apertured to receive the inner ends of the teeth. Each U-shaped clamping member 36 is provided with a set screw 37 which when tightened serves to hold the associated spring tooth rigidly in place on the tooth bar. By loosening the set screws 37, the teeth may be shifted to various spacings, as desired, and more teeth added or some removed, as may be necessary, without disconnecting the tooth bars. The several tooth bars are connected together by arm and link means indicated in its entirety by the reference numeral 39. Each of the arm and link means includes an arm 41 rigidly fixed, as by a clamp 42, to each tool bar, and preferably the arms 41 are arranged in a line approximately midway between the center runner bar 14 and the laterally outer runner bars. A link 44 is pivotally connected, as by bolts 45, to the outer ends of each set of three arms 41, whereby the tooth bars are connected for simultaneous rocking movement. The teeth 35 and the tooth bars 27, 28 and 29, together with associated parts, constitute a tool means or a tool unit carried by the tool supporting means 3 of the frame 1.

The depth adjustment and release control mechanism, with which the present invention is more particularly concerned, is indicated in its entirety by the reference numeral 50 and comprises a rock shaft 51 journaled for rocking movement on suitable brackets 52 fixed to the cross bar 7 of the draft frame 2. A pair of arms, each indicated by the reference numeral 53, is fixed to the outer ends of the rock shaft 51, and each arm 53 is connected by a link 54 to the forward end of the associated link 44 which, with the associated arms 41, connect the tooth bars for simultaneous rocking movement. Preferably, each arm 53 consists of a U-shaped strap member apertured centrally to receive the rock shaft 51, which preferably is square, and folded over to provide means to receive a clamping bolt 55 by which the arm 53 is securely and rigidly clamped to the rock shaft 51. A third arm 57, which preferably is of the same construction as the arms 53 just described, is fixed to the rock shaft 51 in a position centrally thereof and between the two center brackets 52. A longitudinally disposed slidable draft member 58 includes a forward section 58a that is slidable in between the two channels 9 and 10 and a rear section in the form of a link 58b pivoted, as at 59, to the forward section 58a. The forward end of the draft section 58a carries a hammer strap 61, the forward end of the section 58a and the strap 61 being apertured as at 65 (Figure 2), to receive a hitch pin 62, whereby the harrow may be attached to the tractor simply by dropping the pin 62 through the tractor drawbar 63. The rear portion 58b of the slidable draft member 58 is angled upwardly and rearwardly and is pivotally connected at 64 to the center arm 57. Thus, whenever the tractor is backed to shift the draft member 58 rearwardly relative to the draft frame 2, the arms 53, 57 are rocked rearwardly and this, in turn, acts through the arm and link means 39 to swing the tooth bars 27, 28 and 29 in the corresponding direction, lowering the teeth 35 into working position. Similarly, when the tractor is driven forwardly to shift the draft member 58 forwardly relative to the draft frame 2, the teeth are swung in the other direction into their transport position.

In order to control the teeth, by movement of the tractor, from transport to working positions and vice versa, we provide toggle link means 70 which includes a pair of toggle links 71 and 72. The latter link is pivotally connected at its rear end to the upper end of the central arm 57, and the front end of the rear toggle link 72 is extended upwardly, as at 74, and rearwardly thereof is pivoted, as at 75, to the rear end of the front toggle link 71. A trip lever 76 is pivoted, as at 77 (Figure 2), to the upturned end 74 of the rear toggle link 72 and is formed with a cam end 78. A cable 79 extends from the outer end of the trip lever 76 to the operator's station on the tractor. The front end of the toggle link 71 is connected, as at 81, to a manually operated adjusting lever 82 which is pivoted at 83 to a sector 84 fixed to the right hand center draft frame bar 9. The sector 84 is notched to cooperate with detent mechanism 85 carried by the hand lever 82. The lever 82 is arranged to be within easy reach of the tractor operator.

The operation of the implement described above is substantially as follows.

Figure 1 shows the teeth in working position and the toggle mechanism 70 in extended or locked relation, the hand lever 82 being locked to the sector 84. With the parts in these positions, forward draft applied to the slidable drawbar 58 propels the harrow as a unit with the teeth in operating position. The working depth of the harrow teeth may be regulated by unlatching the lever 82 from the sector 84 and moving the lever to various positions. This movement of the adjusting lever 82 shifts the toggle link mechanism 70 and rocks the rock shaft 51 in one direction or the other relative to the draft frame 2. This rocking movement of the rock shaft 51 acts through the links 54 to rock the tooth bars 27—29 and the teeth 35 connected thereto. This adjustment may be made at any time. While the hand lever 82 provides adjustment for practically any field requirement, an even finer adjustment can be made by adjusting the teeth 35 in the tooth clamps 36, 37, as by loosening the set screws 37 and raising or lowering the teeth in the clamping yokes 36.

When it is desired to shift the teeth from working position to a transport position, all that the operator has to do is to pull the cable 79. This rocks the trip lever 76, causing the cam end 78 to bear upon the rear end of the link 71 and raising the pivot 77, and also the pivot connection 75 between the toggle links, thus swinging the latter upwardly beyond dead center relation and unlocking them, whereupon the continued pull exerted through the draft member 58 collapses the toggle links 71, 72 and rocks the rock shaft 51 into transport position, as shown in Figure 2. This movement of the rock shaft 51 raises the teeth 35 out of working position.

It will be noted from Figure 2 that the adjusting lever 82 remains in its position of adjustment even though the locking mechanism has been tripped to permit the draft pull to swing the teeth upwardly into their transport position. When it is desired to lower the teeth into their working position, all that it is necessary to do is to back the tractor relative to the harrow. The resulting rearwardly directed force acting against the arm 57 rocks the rock shaft 51 in a direction to swing the arms 53, 57 rearwardly. The rearward movement of the arms 53 moves the teeth 35 downwardly into their operating position and the rearward movement of the arm 57 extends the toggle links 71, 72 whereby, by virtue of their own weight and the weight of the trip lever 76, the toggle links drop into their over-center or locked position, as shown in Figure 1. It will be seen from Figure 1 that the over-center position of the toggle links 71, 72 is determined by the engagement of the trip lever 76 with the rear end of the link 71 just below the pivot 77. Thus locked, the toggle mechanism 70 reacts through the adjustable hand lever 82 and against the draft frame 2 to prevent the draft member 58 from moving forwardly, and thus the entire harrow is propelled with the teeth in operating position. It is to be noted that the toggle mechanism 70 may be locked or unlocked as desired and that at any time when the teeth are returned to their working position, the setting of the hand lever 82 determines that working position. It is also to be noted that the setting of the hand lever 82 is maintained no matter how many times the locking mechanism is tripped and restored to extended or locked relation.

While in the drawings we have shown our invention as applied to a single section tractor controlled harrow, it should be understood that our invention is not limited to use with a harrow of a single section, as it is adapted for use with one having any number of sections. It is also to be understood that certain features of our invention are adapted for use with other types of implements than harrows provided with spring teeth, and the appended claims are therefore to be construed accordingly. Further, the present invention is not to be limited to the particular details shown and described above, but widely different means may be used in the practice of the broader aspects of our invention.

What we claim, therefore, and desire to secure by Letters Patent is:

1. A harrow comprising a draft frame including a transverse bar, a plurality of runners pivotally connected at their forward ends with said bar, a plurality of transverse tooth bars rockably connected with said runners and carrying harrow teeth, a longitudinally shiftable member slidably connected with said draft frame and operatively connected with said tooth bars whereby rearward movement of said draft member relative to said draft frame swings said teeth into operating position and forward movement of said draft member relative to said draft frame swings said teeth into transport position, a hand lever mounted on said draft frame and adapted to be fixed in various positions relative thereto, and releasable locking mechanism connected between said hand lever and said draft member whereby the latter may be locked in its rearward position and the hand lever shifted to adjust the operating depth of said teeth.

2. A tractor drawn harrow comprising a tool support, tooth bars rockably mounted thereon, a pair of arm and link means connected in laterally spaced relation with said tooth bars for causing all of the latter to rock together, teeth fixed to said bars, a draft frame connected with said tool support, a rock shaft journaled for rocking movement on said draft frame, means connecting said rock shaft with said tooth bars, a draft member shiftable longitudinally on said draft frame and connected at its rear end with said rock shaft whereby when the tractor is connected to said draft member and backed relative to said harrow, said teeth are swung into operating position, releasable toggle link mechanism for holding said rock shaft in one position, corresponding to a working position of said teeth, and a manually adjustable hand lever associated with said toggle link mechanism for varying the working position of said teeth.

3. A tractor drawn harrow comprising frame means, tooth bars rockably mounted thereon, harrow teeth fixed to said bars, a draft member shiftable longitudinally relative to said frame means and operatively connected with said tooth bars for swinging said teeth into and out of operating and transport positions, said draft member being adapted to be connected to said tractor, whereby movement of the latter in one direction relative to the harrow swings said teeth into working position and movement of the tractor and draft member in the other direction relative to the harrow swings said teeth into transport position, a manually adjustable hand lever connected with said frame means, means including a pair of toggle links connected between said hand lever and said shiftable draft member for locking the latter in said one position so as to hold said teeth in working position, movement of said hand lever serving to vary the working position of said teeth, and means controlled from a remote point for unlocking said toggle link mechanism so as to provide for movement of the tractor in said other direction relative to the harrow acting through said draft member to shift said teeth into their transport position without affecting the position of said hand lever.

4. A harrow comprising a tool support, tooth bars rockably mounted thereon, a pair of arm and link means connected in laterally spaced relation with said tooth bars for causing all of the latter to rock together, teeth fixed to said bars, a draft frame connected with the forward portion of said main frame, a rock shaft journaled for rocking movement on said draft frame, a pair of arms fixed to said rock shaft in laterally spaced relation and connected, respectively, with said arm and link means for controlling said tooth bars, a central arm fixed to said rock shaft, a draft member shiftable longitudinally on said draft frame and connected at its rear end with said central arm, a sector fixed to said draft frame forward of said central arm, a hand lever adjustably connected with said sector, means including a pair of toggle links connected between said hand lever and said central arm, whereby when said toggle links are held in extended position said tooth bars and teeth will be held in a given operating position, depending on the position of said hand lever, and a draft pull applied through said draft member will propel the harrow, movement of said hand lever to various positions on the sector serving to adjust the operating position of said tooth bars and harrow teeth, and means controlled from a remote point for unlocking said toggle links to provide for the draft pull acting to collapse said toggle links, rock said rock shaft, and pull said tooth bars and harrow teeth into a non-operating position without affecting the position of adjustment of said hand lever, said harrow teeth being restored to said given operating position and said toggle links being restored to locked position by a rearwardly directed thrust on said draft member acting to move the latter rearwardly.

5. An agricultural implement comprising a tool supporting structure, tool means shiftable relative thereto, a hitch structure connected with said tool supporting structure and including a shiftable member, means connecting said shiftable member with said tool means, whereby the latter may be shifted from one position to another by draft pull transmitted thereto through said connecting means, a manually adjustable lever pivotally mounted on one of said structures and adapted to be fixed to said one structure in different positions of adjustment, a releasable connection between said lever and said tool means for locking said tool means in one position as determined by the position of said lever and holding the tool means against movement toward the other position, but releasable to permit said tool means to shift to another position.

6. A tractor-controlled harrow adapted to be propelled by a tractor, comprising tool supporting means, tool means mounted thereon for movement into operating and non-operating positions, means for applying draft to the tool supporting means comprising a longitudinally shiftable draft member adapted to be connected at its forward end with the tractor and connected at its rear end with said tool means and arranged so that movement of said draft member in one direction relative to said tool supporting means moves said tool means in one direction and movement of the draft member in the other direction relative to said tool supporting means moves said tool means in the other direction, and a depth adjustment and release control comprising an adjusting lever connected with said tool supporting means having latch means for adjustably securing the lever in several positions of adjustment, releasable locking means connected between said lever and said tool means and adapted when locked to hold said tool means in a given position, depending upon the adjustment of said lever, and means for releasing said locking means independent of the position of said lever.

7. An agricultural implement comprising a frame, earth working tools connected with the frame for movement relative thereto between operating and non-operating positions, propelling means for the implement, said propelling means being of the type that backs and moves forward, means movably mounted on the frame and connected with the propelling means and the tools so as to be controlled by the backing of the propelling means for moving said tools into operating position, releasable locking means on the frame and connected between the latter and said tools for holding said tools against movement when in operating position whereby forward movement of said propelling means propels said implement with the tools in working position, and means for shifting said locking means relative to said frame when said means are in locked relation, to vary the operating position of said tools.

8. A tractor propelled harrow adapted to be connected to a tractor of the type that backs and moves forward, said harrow comprising frame means, a plurality of tools connected with the frame for movement relative thereto between operating and non-operating positions, means for connecting said harrow to the tractor including a longitudinally shiftable member movably mounted on the frame and operatively connected with the tractor and said tools whereby backing of the tractor relative to the harrow moves said tools into operating position, releasable locking means on the frame and connected between the latter and said tools for automatically holding said tools against movement when in said operating position whereby subsequent forward movement of the tractor draws said harrow over the ground with said tools in operating position, and manually controlled means for shifting the position of said locking means relative to said frame when said means are in locked relation so as to adjust the operating position of said tools.

9. A harrow comprising a draft frame including a transverse bar, a plurality of runners pivotally connected at their forward ends with said bar, a plurality of transverse tooth bars rockably connected with said runners and carrying harrow teeth, a longitudinally shiftable draft member slidably connected with said draft frame and operatively connected with said tooth bars whereby rearward movement of said draft member relative to said draft frame swings said teeth into operating position and forward movement of said draft member relative to said draft frame swings said teeth into transport position, releasable locking means operative, when said draft member has been moved rearwardly to rock said teeth into operating position, to lock said draft member against forward movement relative to the draft frame, whereby forward pull transmitted to the draft member propels the harrow with the teeth in operating position, and adjustable means for rocking said teeth, and moving said locking means bodily, with the latter in locked position, to vary the depth of operation of said teeth.

10. A harrow comprising a tool support, tooth bars rockably mounted thereon, a pair of arm and link means connected in laterally spaced relation with said tooth bars for causing all of the latter to rock together, teeth fixed to said bars, a draft frame connected with said tool support, a rockshaft journaled for rocking movement on said draft frame, means connecting said rockshaft with said tooth bars, a rigid shiftable draft member on said draft frame operatively connected with said rockshaft whereby movement of said draft member in one direction relative to said draft frame swings said teeth toward one position and movement of said draft member in the other direction relative to said draft frame shifts the teeth toward their other position, and adjustable means releasably locking said teeth in operating position.

11. A tractor drawn harrow comprising a tool support, tooth bars rockably mounted thereon, a pair of arm and link means connected in laterally spaced relation with said tooth bars for causing all of the latter to rock together, teeth fixed to said bars, a draft frame connected with said tool support, a rockshaft journaled for rocking movement on said draft frame, means connecting said rockshaft with said tooth bars, a rigid draft member shiftable longitudinally on said draft frame and connected at its rear end with said rockshaft whereby when the tractor is connected to said draft member and backed relative to said harrow, said teeth are swung into operating position, and releasable means for locking said teeth in said operating position.

12. A harrow comprising a draft frame, a plurality of runners pivotally connected at their forward ends with said draft frame, a plurality of transverse tooth bars rockably connected with said runners and carrying harrow teeth, a longitudinally shiftable draft member slidably connected with said draft frame and operatively connected with said tooth bars whereby rearward movement of said draft member relative to said draft frame swings said teeth into operating position and forward movement of said draft member relative to said draft frame swings said teeth into transport position, releasable locking means operative, when said draft member has been moved rearwardly to rock said teeth into operating position, to lock said draft member against forward movement relative to the draft frame, whereby forward pull transmitted to the draft member propels the harrow with the teeth in operating position, and adjustable means for rocking said teeth and moving said locking means bodily, with the latter in locked position, to vary the depth of operation of said teeth.

CURTISS L. COOK.
AUSTIN E. YOUNG.